United States Patent
Babin et al.

(10) Patent No.: US 7,701,564 B2
(45) Date of Patent: Apr. 20, 2010

(54) SYSTEM AND METHOD FOR ANGULAR MEASUREMENT

(75) Inventors: Mike Babin, Foster City, CA (US);
Stephen Eichblatt, San Jose, CA (US);
Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 337 days.

(21) Appl. No.: 11/131,645

(22) Filed: May 18, 2005

(65) Prior Publication Data
US 2006/0262294 A1    Nov. 23, 2006

(51) Int. Cl.
*G01B 11/26*    (2006.01)
(52) U.S. Cl. ........................................ 356/138
(58) Field of Classification Search ................ 356/138, 356/139.1, 153–154
See application file for complete search history.

(56) References Cited

U.S. PATENT DOCUMENTS

| | | | | |
|---|---|---|---|---|
| 3,334,537 A | * | 8/1967 | Beattie | 356/325 |
| 4,240,069 A | * | 12/1980 | Hullein et al. | 341/7 |
| 4,410,269 A | | 10/1983 | Jeffery | |
| 4,895,440 A | * | 1/1990 | Cain et al. | 356/5.08 |
| 5,218,424 A | * | 6/1993 | Sommargren | 356/492 |
| 5,486,924 A | * | 1/1996 | Lacey | 356/507 |
| 5,644,562 A | * | 7/1997 | de Groot | 356/504 |
| 5,860,749 A | * | 1/1999 | Hirakawa et al. | 384/492 |
| 6,055,056 A | | 4/2000 | Kuehmstedt et al. | |
| 6,057,976 A | * | 5/2000 | Ishida et al. | 360/77.03 |
| 6,324,487 B1 | * | 11/2001 | Qian et al. | 702/147 |
| 6,477,013 B1 | | 11/2002 | Kang et al. | |
| 6,775,013 B2 | * | 8/2004 | Wang | 356/614 |
| 6,943,989 B2 | * | 9/2005 | Cha et al. | 360/236.2 |
| 7,092,213 B1 | * | 8/2006 | Cha | 360/235.4 |
| 2006/0233061 A1 | * | 10/2006 | Rausch et al. | 369/13.32 |

FOREIGN PATENT DOCUMENTS

| | | | |
|---|---|---|---|
| JP | 56037503 | | 4/1981 |
| JP | 56037503 A | * | 4/1981 |
| JP | 56112606 | | 9/1981 |
| JP | 60097235 | | 5/1985 |
| JP | 60152928 | | 8/1985 |
| JP | 60152928 A | * | 8/1985 |
| JP | 60152929 | | 8/1985 |
| JP | 2088913 | | 3/1990 |
| JP | 4035863 | | 2/1992 |
| JP | 6026837 | | 2/1994 |
| JP | 2003247934 A | * | 9/2003 |
| JP | 2004245634 A | * | 9/2004 |
| JP | 2005292037 A | * | 10/2005 |

* cited by examiner

*Primary Examiner*—Tarifur R. Chowdhury
*Assistant Examiner*—Isiaka O Akanbi (57) ABSTRACT

Embodiments of the present invention include a method for measuring an angle between a first surface and a second surface of an object. The method includes rotating an object around a center axis of the object and shining a light source perpendicular to the center axis of the object. The method further includes measuring an intensity of a reflected light with respect to time and determining an angle between two or more surfaces of the object based on the intensity of the reflected light with respect to time.

23 Claims, 6 Drawing Sheets

```
Rotating an object around a center axis of the object
410
         │
         ▼
Shining a light source perpendicular to the axis of
rotation of the object
420
         │
         ▼
Measuring an intensity of a reflected light with
respect to time
430
         │
         ▼
Determining an angle between two or more surfaces of
the object based on the intensity of the reflected light
440
```

SYSTEM AND METHOD FOR ANGULAR MEASUREMENT

FIELD OF THE INVENTION

The present invention relates to the field of data storage devices. More particularly, embodiments of the present invention relate to measuring angular dimensions of components in a disk drive assembly.

BACKGROUND OF THE INVENTION

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a substantially constant rotational speed. An actuator arm or slider is utilized to reach out over the disk. The arm has a head-gimbal-assembly (HGA) composed of a suspension, flexure and a slider carrying the read/write components.

In operation, the hard disk is rotated at a set speed via a spindle motor assembly having a central drive hub. Additionally, there are tracks evenly spaced at known intervals across the disk. When a request for a read of a specific portion or track is received, the actuator and servo-system of the hard drive aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

As the data storage industry constantly strives to improve data storage density, it is becoming increasingly important to reduce the clearance of slider assembly over the surface of the magnetic disk. However, as the slider-to-disk spacing becomes smaller than 10 nanometers (10 nm), the electrostatic and intermolecular forces between the slider and disk become increasingly significant. Therefore, a need exists for determining contact potential voltages and clearance data between a slider body and a hard disk of a hard disk drive.

However, the small drives have small components with very narrow tolerances. Disk drive sliders are designed to fly in very close proximity to the disk surface. For instance, in some systems slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations in the slider that can cause media damage and can also cause data loss during read and write operations.

SUMMARY OF THE INVENTION

Embodiments of the present invention include a method for measuring an angle between a first surface and a second surface of an object. The method includes rotating an object around a center axis of the object and shining a light source near perpendicular to the center axis of the object. The method further includes measuring an intensity of a reflected light with respect to time and determining an angle between two or more surfaces of the object based on the intensity of the reflected light with respect to time. A System for measuring an angle between a first surface and a second surface of an object is also disclosed.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Reference will now be made in detail to embodiments of the present invention, a system and method for angular measurement, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Recently, with increase in capacity of a hard disk drive, it is required to reduce a size and a width of a track and a gap of a combined type magnetic head having a slider. Since a thin magnetic film becomes more popular, precise control with excellent productivity is required also in lapping process of the magnetic head slider.

Generally, in a conventional working process of the magnetic head slider, since a row bar in which a plurality of magnetic head elements are aligned in a line is cut out from a wafer and the cut out row bar is lapped into a desired size, the row bar is pushed against a lapping plate under a predetermined pressure and the row bar is lapped.

The angle between the lapping surface and the deposited end of a disk drive slider must be measured to within 1/50 of one degree in order to ensure proper lapping. Measuring angles on small devices to such precision is difficult.

Embodiments of the present invention include a method for measuring an angle between a first surface and a second surface of an object. The method includes rotating an object around a center axis of the object and shining a light source perpendicular to the center axis of the object. The method further includes measuring an intensity of a reflected light with respect to time and determining an angle between two or more surfaces of the object based on the intensity of the reflected light with respect to time. A System for measuring an angle between a first surface and a second surface of an object is also disclosed.

Embodiments of the present invention measure the angle between the faces of a disk drive slider. A disk drive slider, for purposes of illustration of embodiments of the invention, are small cubes that sit on top of a data storage disk and read information (e.g., data) from the disk. The geometry of the cube is important to the operation of a disk drive assembly. In one embodiment of the invention, the disk drive slider comprises six sides (e.g., surfaces).

Figure 1:
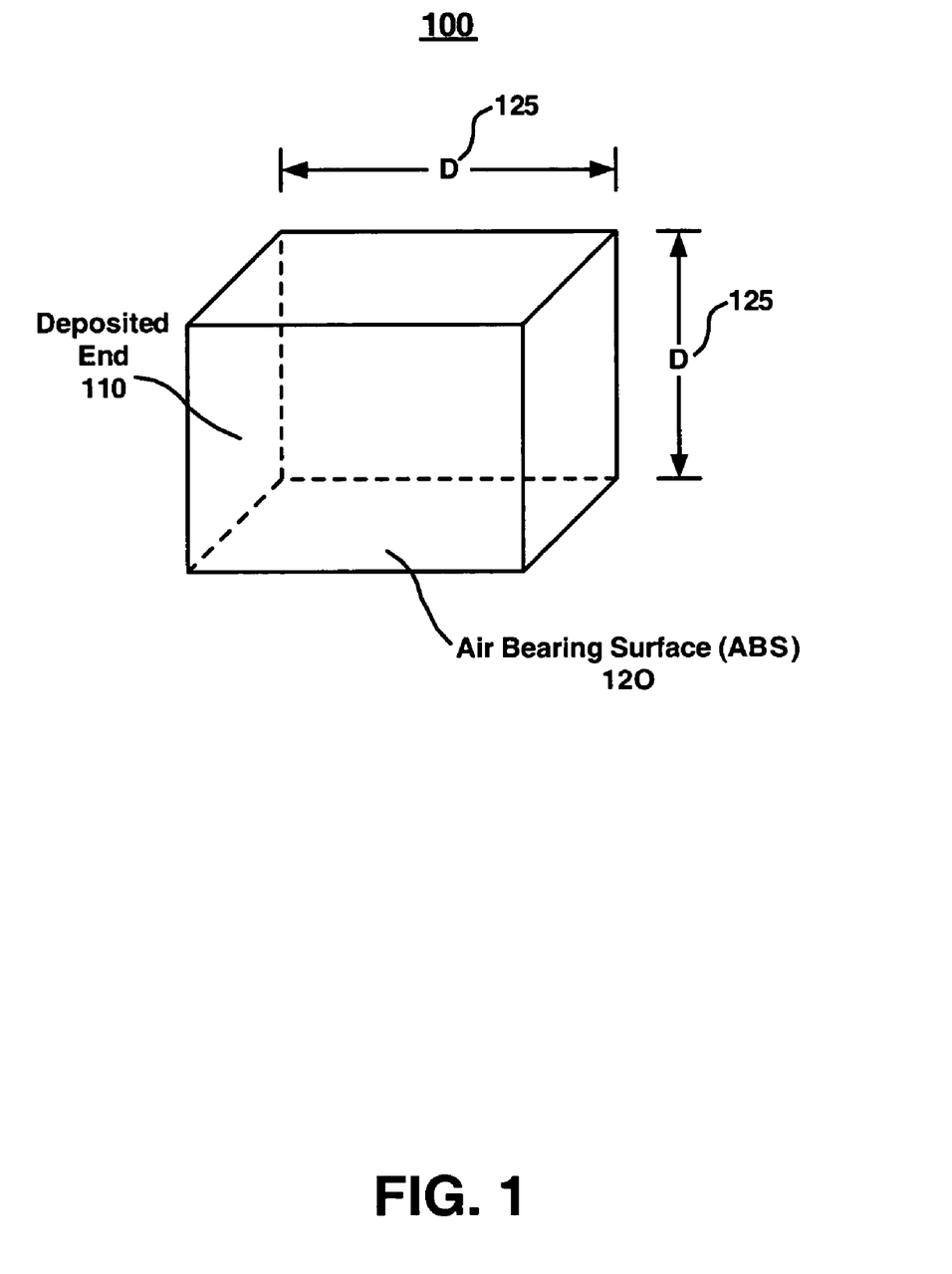
FIG. 1 is a perspective view of an exemplary disk drive slider comprising a deposited end and an air-bearing surface in accordance with embodiments of the present invention.

FIG. 1 is an illustration of an exemplary disk drive slider 100 in accordance with embodiments of the present invention. The slider 100 comprises six faces and one of the faces is the deposited end 110 and another face is the air bearing surface 120 (ABS). The deposited surface 110 is the side that is deposited with metal. For example, the disk drive slider 100 may start as a wafer that is cut into individual sliders. The deposited face corresponds to the surface of the wafer that has metal deposited on it (e.g., top surface). Many well-known methods in the art for depositing metal on a wafer can be used in accordance with embodiments of the present invention.

The ABS 120 is the surface of the slider that flies over the data storage disk of the disk drive assembly. In one embodiment of the invention, the ABS 120 and the deposited surface 110 are adjacent faces on the slider 100. In one embodiment of the invention, the ABS 120 and the deposited end 110 intersect at an angle of approximately 90 degrees. Embodiments of the present invention measure the angle between the ABS 120 and the deposited surface 110 to within 1/50 of one degree. Although the description of the present invention uses the dimension of degrees, it is appreciated that the present invention can be used to determine the angle between the ABS 120 and the deposited end 110 in radians. In one embodiment of the present invention, the disk drive slider 100 has an approximate dimension 125 of 1×1×1 mm³.

Figure 2:
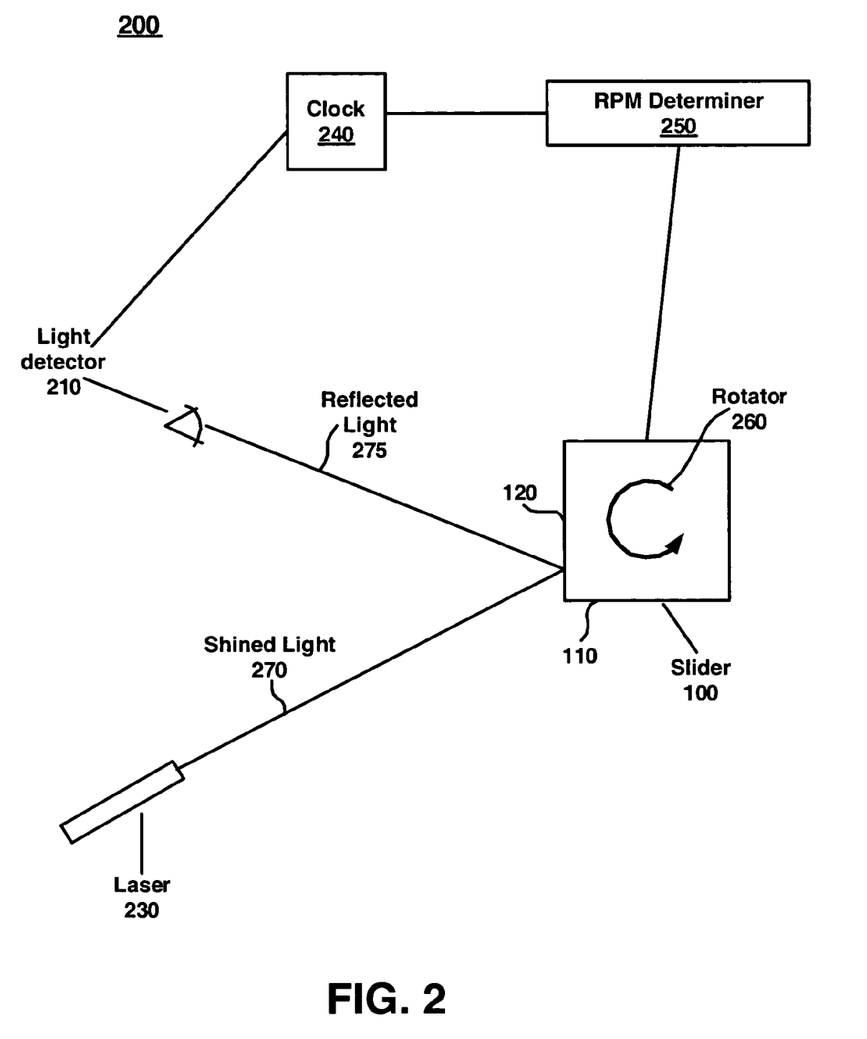
FIG. 2 is an illustration of an exemplary system for angular measurement in accordance with embodiments of the present invention.

FIG. 2 is an illustration of an exemplary system 200 for angular measurement in accordance with embodiments of the present invention. A rotator 260 rotates an object (e.g., slider 100). In one embodiment of the invention, the rotator rotates the object at a constant frequency. A frequency determiner 250 determines the frequency of the rotation. A clock 240 keeps track of time.

In one embodiment of the invention, the object is rotated about a center axis of the object. In one embodiment of the invention, the rotator comprises a relatively heavy flywheel that helps maintain a constant frequency once the rotator achieves the desired frequency. In one embodiment of the invention, the frequency can be any frequency, however, the higher the frequency the more measurements that can be taken for a given time period.

A light (e.g., laser 230) is shined at the slider 100 such that the shined light 270 is perpendicular to the faces that are being measured, for example, the deposited surface 110 and the ABS 120. In one embodiment of the invention, the shined light is perpendicular to the center of the object that the object is rotated about. The shined light 270 is reflected off the surfaces of the object and a light detector 210 detects the reflected light 275. The intensity of the reflected light 275 depends on the orientation of the surface the light is being reflected off. As a function of time, the intensity of reflected light 275 received at the detector goes from no light to a maximum of intensity of light back to no light.

Figure 3:
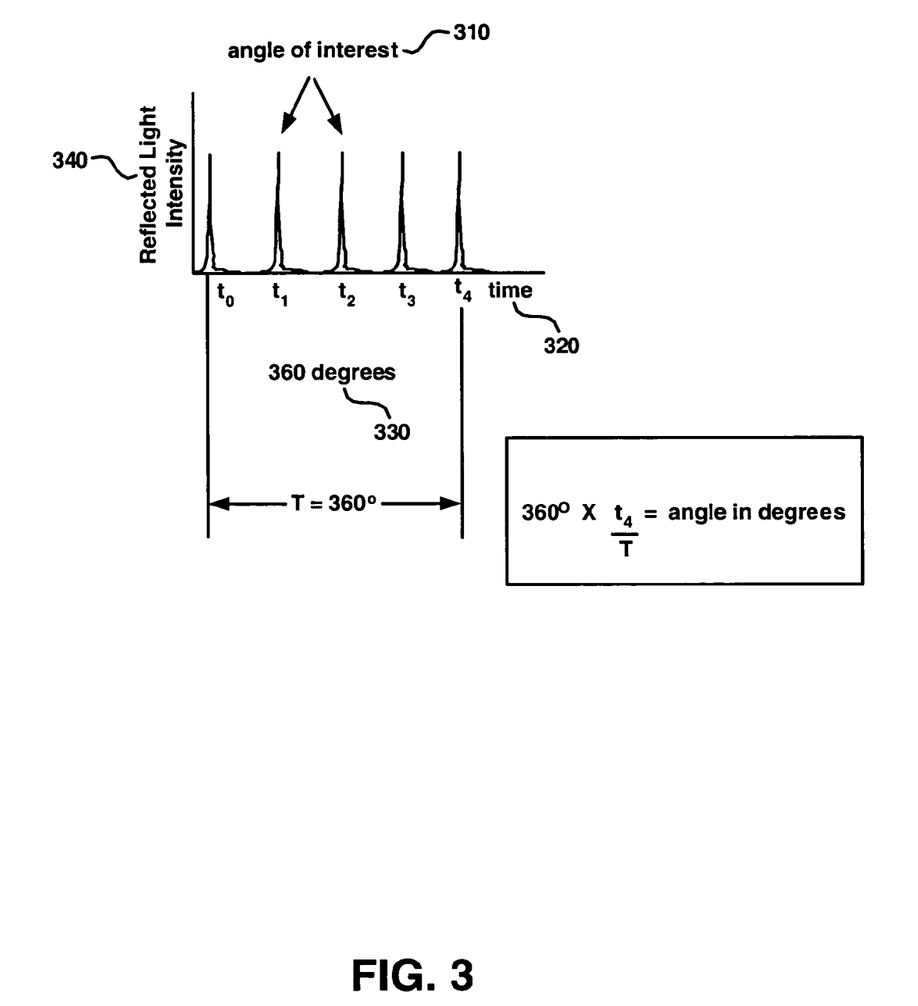
FIG. 3 is an illustration of an exemplary plot of light intensity with respect to time in accordance with embodiments of the present invention.

FIG. 3 is an illustration of a plot of reflected light intensity 340 of reflected light with respect to time 320. In the case of measuring the angles of a slider 100, there are four peaks of light intensity for one revolution of the slider (from just after $t_0$ to just after $t_4$), which corresponds to 360 degrees of rotation. This acts like an automatic calibration of the system 100 because the frequency of rotation does not matter if the time to make a complete revolution is known. The time (e.g., $t_0$, $t_1$, $t_2$, $t_n$) for a peak of light intensity (for a given surface) divided by the total time to complete one revolution ($t_n$) multiplied by 360 degrees is the angle.

$$(360 \text{ degrees}) * (t_n/T) = \text{angle in degrees}$$

The time between the peak corresponding to the bonded surface and the peak corresponding to the ABS divided by the time to make a complete revolution multiplied by 360 degrees is equal to the angle between the deposited side and the ABS in degrees. The ratio can be calculated multiple times to achieve a statistically accurate measurement to the margin of error determined to be acceptable.

Figure 4:
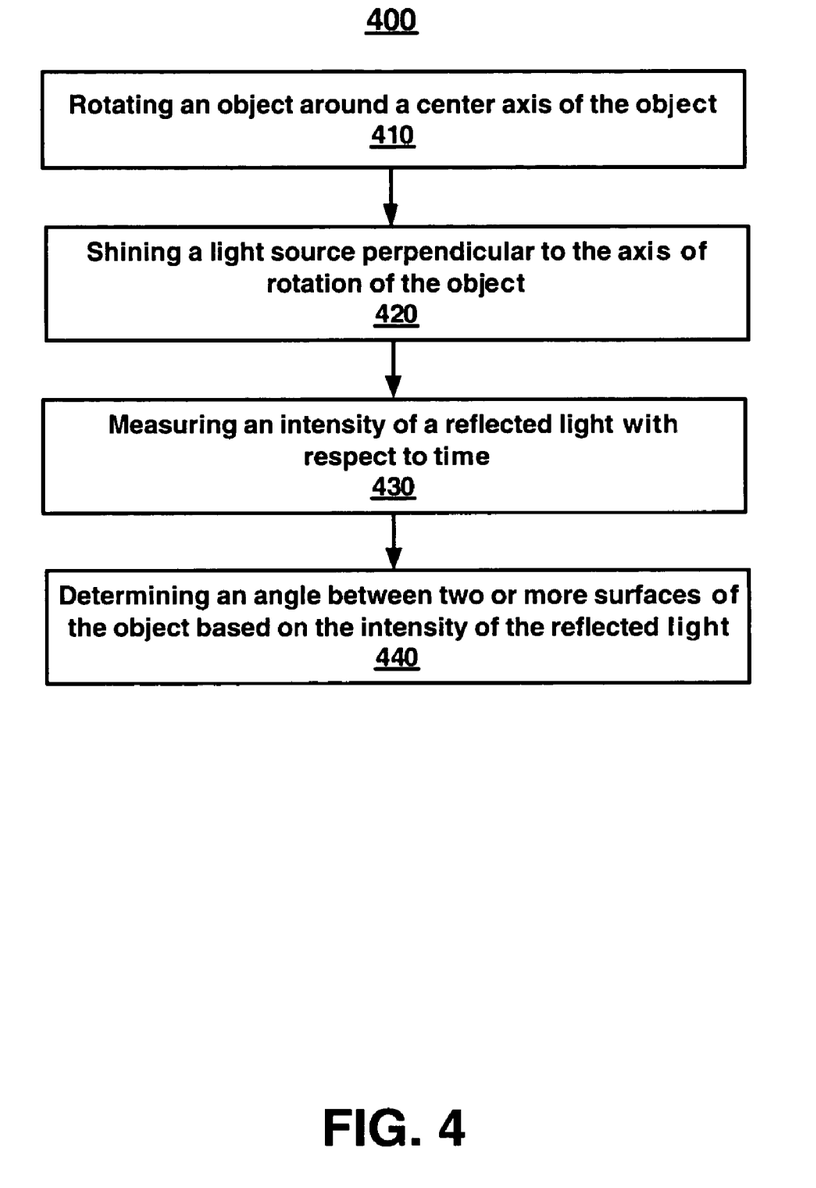
FIG. 4 is a flow diagram of an exemplary method for angular measurement in accordance with embodiments of the present invention.

FIG. 4 is a flow diagram of an exemplary process 400 for angular measurement in accordance with embodiments of the present invention.

At step 410, process 400 includes rotating an object around a center axis of the object. In one embodiment of the invention, the object is a disk drive slider. In one embodiment of the invention, the object in 1 mm³ or less. In one embodiment of the invention, the object is rotated at a constant frequency. In another embodiment of the invention, the frequency of rotation is not constant and the angular measurement system self calibrates in response to determining a new time T after each full revolution.

At step 420, process 400 includes shining a light source perpendicular to the center axis of the object that the object is rotated about. In one embodiment of the invention a laser light source is used, however, it is appreciated that any light source, or any reflective sound, light or energy source can be used in accordance with embodiments of the present invention.

At step 430, process 400 includes measuring an intensity of a reflected light with respect to time. In one embodiment of thee invention, each peak of light intensity is time stamped. In one embodiment of the invention, a light sensor is used to capture the reflected light. In one embodiment of the invention, an exemplary computer system 500 as described in conjunction with FIG. 5 can be used to perform steps 430 and 440 of process 400.

At step 440, process 400 includes determining an angle between two or more surfaces of the object based on the intensity of reflected light with respect to time. In one embodiment of the invention, the equation (360 degrees)*($t_n$/T)=angle in degrees can be used to determine the angle wherein $t_n$ is equal to the time elapsed for a peak and T is equal to the time to complete a full revolution of the object.

Figure 5:
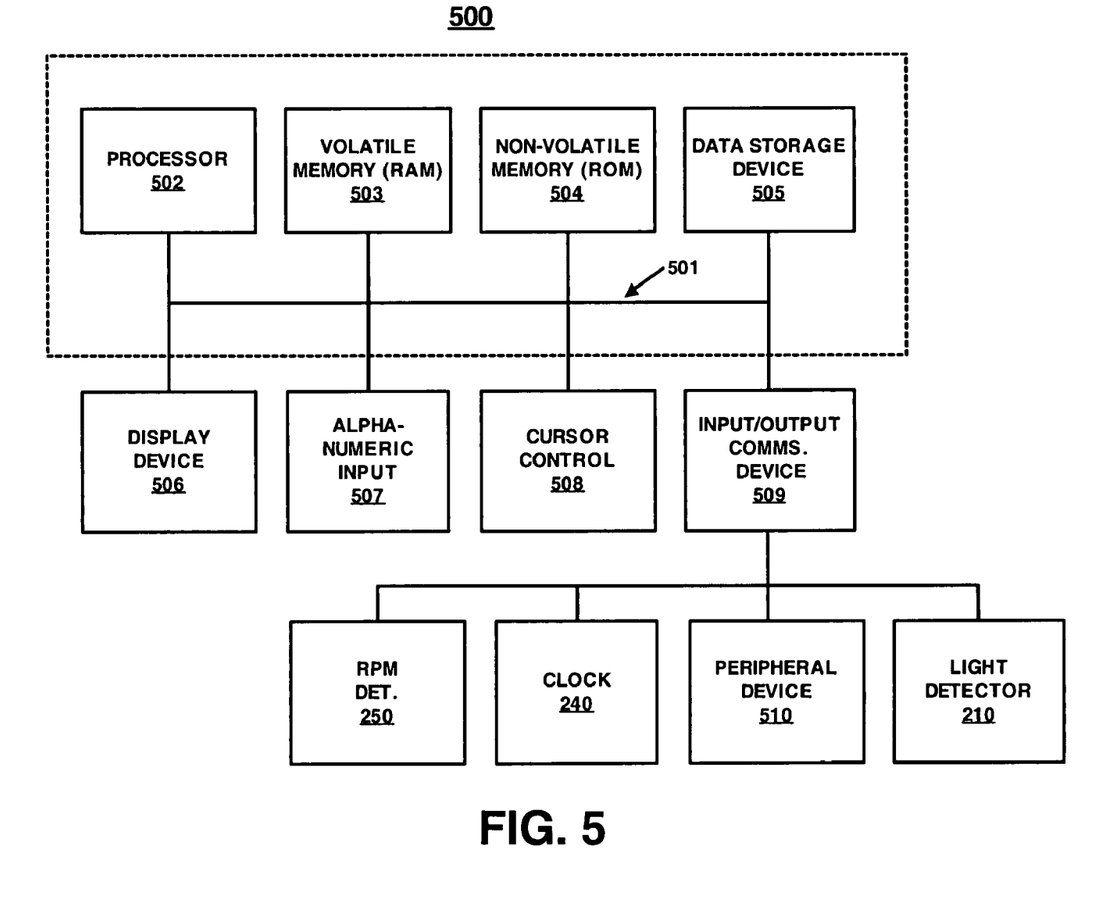
FIG. 5 is a block diagram of an exemplary computer system in accordance with embodiments of the present invention.

Referring now to FIG. 5, a block diagram of exemplary computer system 500 is shown. It is appreciated that computer system 500 of FIG. 5 described herein illustrates an exemplary configuration of an operational platform upon which embodiments of the present invention can be implemented. Nevertheless, other computer systems with differing configurations can also be used in place of computer system 500 within the scope of the present invention. For example, computer system 500 could be a server system, the client system, a node on a network, a personal computer, a game console or an embedded computer system. Furthermore, computer system 500 could be a multiprocessor computer system.

Computer system 500 includes an address/data bus 501 for communicating information, a central processor 502 coupled with bus 501 for processing information and instructions, a volatile memory unit 503 (e.g., random access memory, static RAM, dynamic RAM, etc.) coupled with bus 501 for storing information and instructions for central processor 502 and a non-volatile memory unit 504 (e.g., read only memory, programmable ROM, flash memory, EPROM, EEPROM, etc.) coupled with bus 501 for storing static information and instructions for processor 502. Computer system 500 may also contain a display device 506 coupled to bus 501 for displaying information to the computer user. In one embodiment of the invention, display device 506 is a video display projector. Moreover, computer system 500 also includes a data storage device 505 (e.g., disk drive) for storing information and instructions.

Also included in computer system 500 of FIG. 5 is an optional alphanumeric input device 507. Device 507 can communicate information and command selections to central processor 502. Computer system 500 also includes an optional cursor control or directing device 508 coupled to bus 501 for communicating user input information and command selections to central processor 502. Computer system 500 also includes signal communication interface 509, which is also coupled to bus 501, and can be a serial port. Communication interface 509 can also include number of wireless communication mechanisms such as infrared or a Bluetooth protocol. Computer system 500 also comprises an optional clock or timer 240 coupled to bus 501. Furthermore, an optional light detector 210 and RPM determiner 250 are coupled to bus 501.

Figure 6:
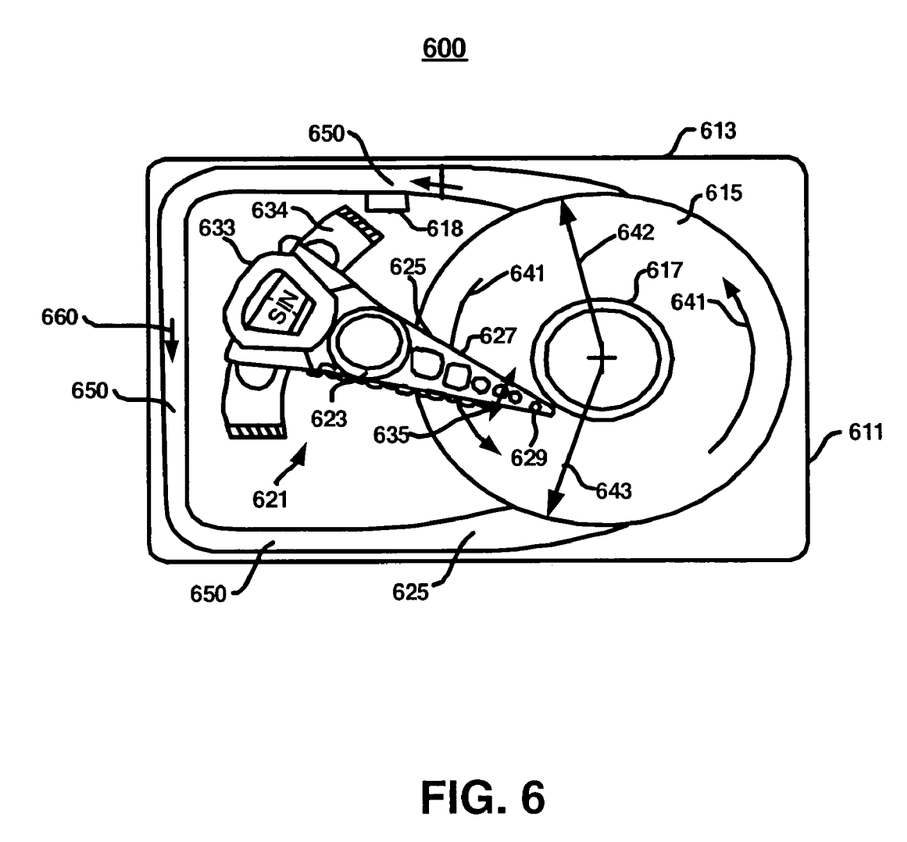
FIG. 6 is an illustration of an exemplary disk drive assembly in accordance with embodiments of the present invention.

With reference now to FIG. 6, a schematic drawing of one embodiment of an information storage system 600 comprising a magnetic hard disk file or drive 611 for a computer system is shown (e.g., computer system 500 of FIG. 5). Drive 611 has an outer housing or base 613 containing a disk pack having at least one media or magnetic disk 615. The disk or disks 615 are rotated (see arrows 641) by a spindle motor assembly having a central drive hub 617. An actuator 621 comprises a plurality of parallel actuator arms 625 (one shown) in the form of a comb that is movably or pivotally mounted to base 613 about a pivot assembly 623. A controller 619 is also mounted to base 613 for selectively moving the comb of arms 625 relative to disk 615.

In the embodiment shown, each arm 625 has extending from it at least one cantilevered load beam and suspension 627. A magnetic read/write transducer or head is mounted on a slider 629 and secured to a flexure that is flexibly mounted to each suspension 627. The read/write heads magnetically read data from and/or magnetically write data to disk 615. The level of integration called the head gimbal assembly (HGA) is head and the slider 629, which are mounted on suspension 627. The slider 629 is usually bonded to the end of suspension 627. The head is typically pico size (approximately 1160×1000×300 microns) and formed from ceramic or intermetallic materials. The head also may be of "femto" size (approximately 850×700×230 microns) and is pre-loaded against the surface of disk 615 (in the range two to ten grams) by suspension 627.

Suspensions 627 have a spring-like quality, which biases or urges the air-bearing surface of the slider 629 against the disk 615 to cause the slider 629 to fly at a precise distance from the disk. A voice coil 633 free to move within a conventional voice coil motor magnet assembly 634 (top pole not shown) is also mounted to arms 625 opposite the head gimbal assemblies. Movement of the actuator 621 (indicated by arrow 635) by controller 619 moves the head gimbal assemblies along radial arcs across tracks on the disk 615 until the heads settle on their respective target tracks. The head gimbal assemblies operate in a conventional manner and always move in unison with one another, unless drive 611 uses multiple independent actuators (not shown) wherein the arms can move independently of one another.

Referring still to FIG. 6, the disk pack and disks 615 (one shown) define an axis 640 of rotation 641 and radial directions 642, 643, relative to the axis 640. The drive 611 also has an optional bypass channel 650 formed in the housing 613 for directing the airflow 660 generated by rotation of the disks 615 from the upstream side of the disk pack or disks (e.g., proximate to radial direction 642 in FIG. 6) 615 to the downstream side of the disk pack or disks 615 (e.g., proximate to radial direction 643 in FIG. 6).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computer readable medium comprising instructions that when executed perform a method for measuring an angle between a first surface and a second surface of an object, said method comprising:

rotating said object around a center axis of said object, wherein said rotation is at least one revolution of said object;

shining a light from a light source, wherein said light is perpendicular to said center axis of said object and said light is unobstructed to a surface of said object;

measuring an intensity of a reflected light with respect to time, wherein said measuring occurs during said at least one revolution of said object; and determining an angle between two or more surfaces of said object based on said intensity of said reflected light;

wherein said object is a disk drive slider and said angle is between an air bearing surface of said disk drive slider and a deposited end of said disk drive slider.

2. The computer readable medium as described in claim 1 wherein said method further comprises:
   determining a time between a first peak intensity of light and a second peak intensity of light.

3. The computer readable medium as described in claim 1 wherein said method further comprises:
   determining a rotational velocity of said rotating.

4. The computer readable medium as described in claim 1 wherein said light source is a laser.

5. The computer readable medium as described in claim 1 wherein said method further comprises:
   plotting said intensity of said reflected light with respect to time.

6. The computer readable medium as described in claim 1 wherein said object comprises at least six surfaces.

7. The computer readable medium as described in claim 1 wherein said rotating is at a substantially constant frequency.

8. A computer readable medium comprising instructions that when executed perform a method for measuring an angle between a first surface and a second surface of an object comprising:
   rotating said object at a constant frequency, wherein said rotation is at least one revolution of said object;
   shining a light from a light source, wherein said light is unobstructed and perpendicular to a surface of said object;
   measuring an intensity of reflected light with respect to time, wherein said measuring occurs during said at least one revolution of said object; and
   determining an angle between two or more surfaces of said object based on said intensity of said reflected light;
   wherein said surfaces comprise an air-bearing surface of a disk drive slider and a deposited end of a disk drive slider.

9. The computer readable medium as described in claim 8 wherein said light source is a laser.

10. The computer readable medium as described in claim 8 wherein said object comprises six or more surfaces.

11. The computer readable medium as described in claim 8 wherein said method further comprises:
   rotating said object around a center axis of said object.

12. The computer readable medium as described in claim 11 wherein said light source is shined perpendicular to said center axis of rotation.

13. The computer readable medium as described in claim 8 wherein said method further comprises:
   plotting said intensity of reflected light with respect to time.

14. The computer readable medium as described in claim 8 wherein said method further comprises:
   dividing a time between two or more peaks of intensity of said reflected light by a time to complete one revolution of said object to determine said angle.

15. The computer readable medium as described in claim 8 wherein said object is a disk drive slider.

16. A system for measuring an angle between a first surface and a second surface of an object, said system comprising:
   a rotator for rotating an object, wherein said rotation is at least one revolution of said object;
   a light source for shining an unobstructed light at said object;
   a detector for detecting an intensity of light reflected from said object; and
   a clock for tracking time; and
   a computer readable medium comprising instructions that when executed perform a method for measuring said angle, said method comprising:
   rotating said object on said rotator, wherein said rotation is at least one revolution of said object;
   shining said light source at said object;
   measuring an intensity of a reflected light with respect to time, wherein said measuring occurs during said at least one revolution of said object; and
   determining said angle between two or more surfaces of said object based on said intensity of said reflected light and said time;
   wherein said first surface and said second surface comprise an air-bearing surface of a disk drive slider and a deposited end of a disk drive slider.

17. The system as described in claim 16 wherein said light source is a laser.

18. The system as described in claim 16 wherein said object comprises six or more surfaces.

19. The system as described in claim 16 wherein said object is rotated around a center axis of said object.

20. The system as described in claim 19 wherein said light source is shined perpendicular to said center axis of rotation.

21. The system as described in claim 16 further comprising:
   a plotter for plotting said intensity of reflected light with respect to said time.

22. The system as described in claim 16 further comprising:
   an angle determiner for dividing a period of time between two or more peaks of intensity of said reflected light by a time to complete one or more revolutions of said object to determine said angle.

23. The system as described in claim 16 wherein said object is a disk drive slider.

* * * * *